United States Patent [19]

Johnson

[11] Patent Number: 5,105,549
[45] Date of Patent: Apr. 21, 1992

[54] LEVEL WITH TOP-READING MAGNIFICATION

[75] Inventor: Wiliam G. Johnson, Mequon, Wis.

[73] Assignee: Johnson Level & Tool Mfg. Co., Inc., Mequon, Wis.

[21] Appl. No.: 715,416

[22] Filed: Jun. 14, 1991

[51] Int. Cl.⁵ ............................................. G01C 9/28
[52] U.S. Cl. ............................................. 33/379
[58] Field of Search ................. 33/379, 348, 381, 382, 33/390

[56] References Cited

U.S. PATENT DOCUMENTS

| | | | |
|---|---|---|---|
| 2,750,677 | 6/1956 | Wirth | 33/382 |
| 3,835,549 | 9/1974 | De Jong | 33/379 |
| 4,011,660 | 3/1977 | Johnson | 33/379 |
| 4,208,803 | 6/1980 | Brown | 33/379 X |
| 4,492,038 | 1/1985 | Mayes | |
| 4,765,061 | 8/1988 | Rawlings et al. | |

Primary Examiner—Harry N. Haroian
Attorney, Agent, or Firm—Andrus, Sceales, Starke & Sawall

[57] ABSTRACT

A level is provided with a top-reading feature, allowing a vial to be viewed through the upper flange of the level. A magnifying element is disposed between the vial and an opening formed in the upper flange, to magnify the vial when it observed from the top of the level. The magnifying element is preferably formed integrally with a transparent lens, which is retained between a vial cover and a side of the web of the level frame. Complementary structure is provided on the lens on the opposite side of the web, for sealing the internal cavity defined by the vial covers, in combination with the lenses, to prevent entry of dirt or other foreign material into the cavity.

11 Claims, 2 Drawing Sheets

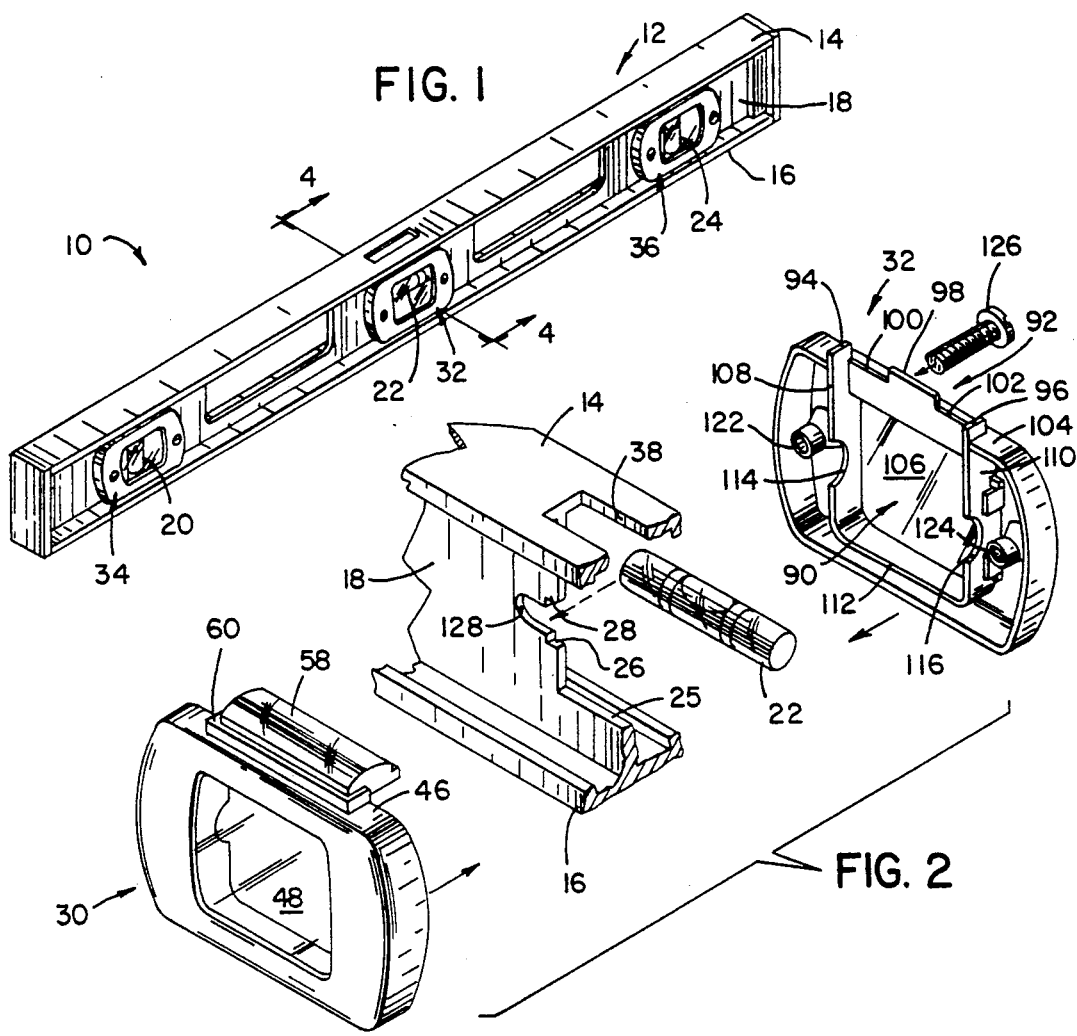
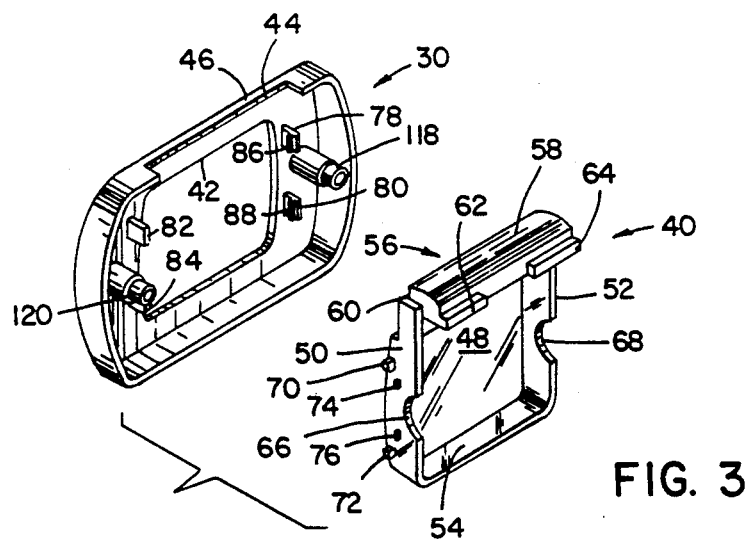

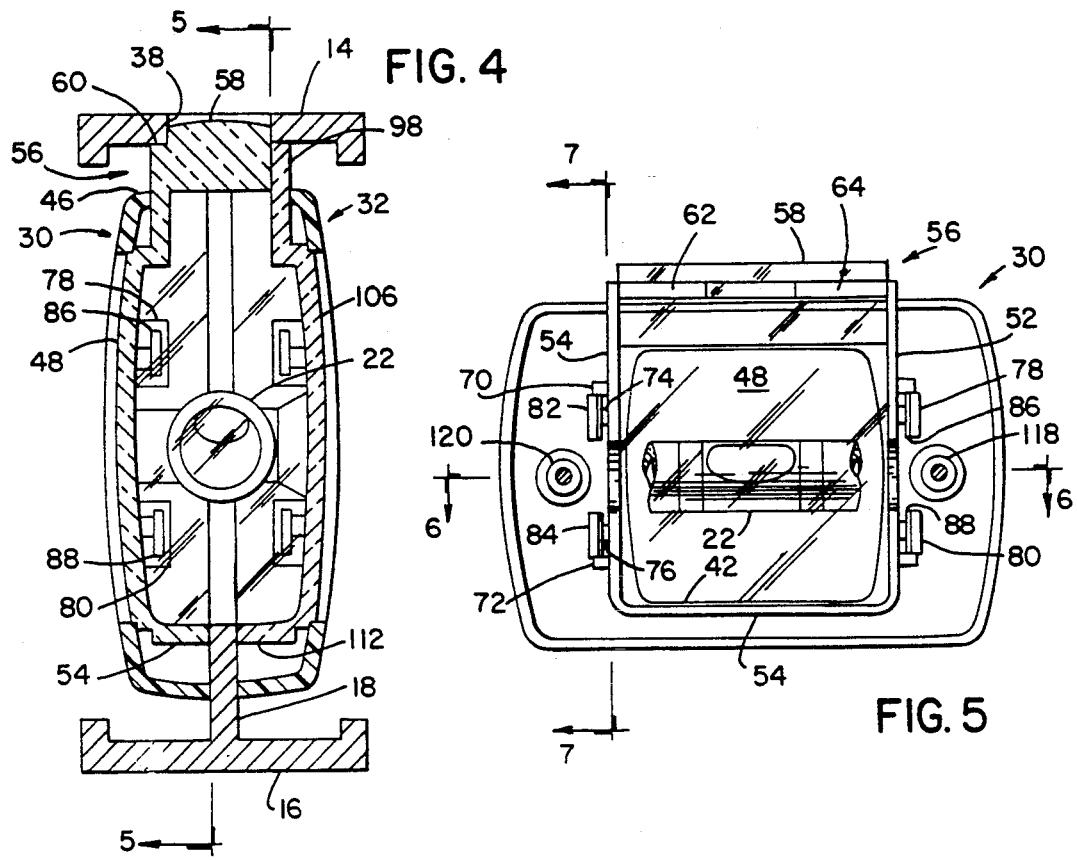
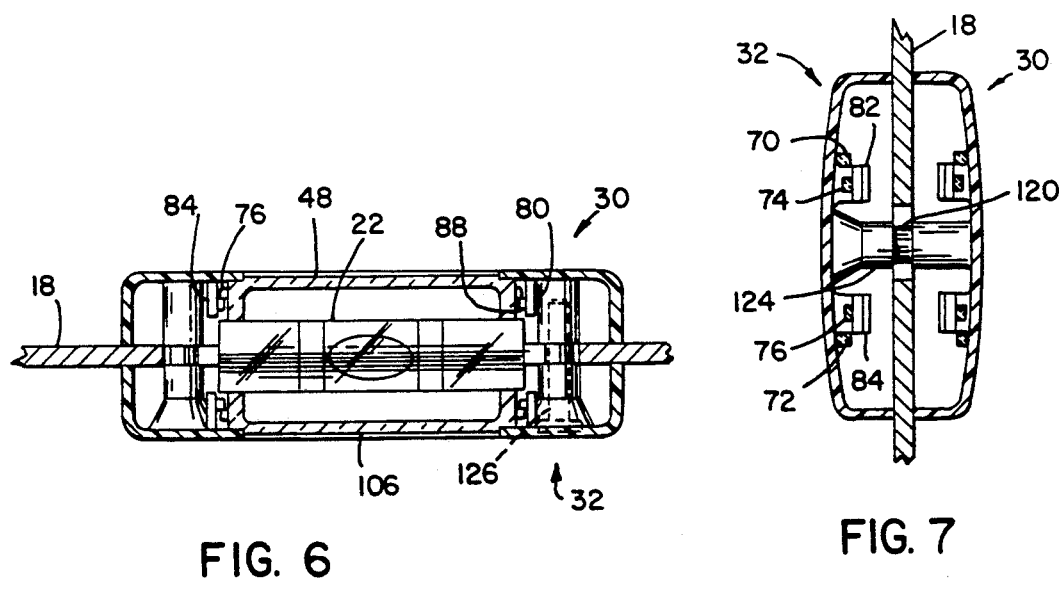

LEVEL WITH TOP-READING MAGNIFICATION

BACKGROUND AND SUMMARY

This invention relates to hand tools, and more particularly to a device, commonly known as a level, for indicating the angular relationship of a substantially flat work surface to level, plumb, or other datum.

A spirit level generally consists of a frame providing flat horizontal top and bottom surfaces adapted for placement on a work surface. One or more spirit vials are mounted to the frame in a predetermined orientation relative to the top and bottom surfaces of the level. In a typical application, three vials are mounted to the frame. The central vial is oriented such that its longitudinal axis is parallel to the planes of the top and bottom surfaces. One of the end vials is oriented such that its longitudinal axis is oriented perpendicular to the planes of the top and bottom surfaces. The other end vial may have an orientation similar to that of the first-mentioned end vial, or it may be positioned such that its longitudinal axis is oriented 45° to the plane of the top and bottom surfaces.

It is known to provide an opening in the top surface of the level to extend the range of positions from which the level-indicating vial can be viewed. This topreading feature is shown in Johnson U.S. Pat. No. 4,011,660 issued Mar. 15, 1977; Mayes U.S. Pat. No. 4,492,038 issued Jan. 8, 1985, and Rawlings et al U.S. Pat. No. 4,765,061 issued Aug. 23, 1988.

It is an object of the present invention to provide an improvement to a top-reading feature associated with a level, such as is exemplified in the noted patents. Specifically, the present invention has as its object to provide magnification of the level vial when viewed through the opening formed in the top surface of the level, to enhance the advantages provided by the top-reading feature. It is a further object of the invention to provide a top-reading level, with magnification of the vial, in which the magnifying element is secured within the opening in an advantageous manner.

The invention is employed in combination with a level of conventional construction, which typically comprises horizontal top and bottom surfaces, with an interposed body portion in which a cavity is formed. A vial is located within the cavity for providing an indication of the relationship to level, or other datum, of the work surface when the bottom surface is placed thereon. In accordance with one aspect of the invention, an opening is formed in the top surface of the level, and is in visual communication with the cavity to allow the vial to be viewed through the opening. A transparent magnifying element is located between the vial and the opening for providing magnification of the vial when viewed through the opening. In one form of the invention, the level consists of a frame having upper and lower horizontal flanges with a vertical web disposed therebetween, with the cavity in the level body portion comprising a vial-receiving opening formed in the web. A pair of vial covers are located one on either side of the web, defining an internal cavity within which the vial is located. Each vial cover defines a window opening for providing visual access to the vial therethrough. A transparent lens is located within each window opening, and is positioned between one of the vial covers and a side of the web. The magnifying element is formed integrally with a first one of the lenses. The first lens includes a laterally extending upper portion, and the magnifying element is defined by the first lens upper portion. Each of the lenses includes structure which engages the underside of the upper flange adjacent the opening, for sealing the internal cavity defined by the vial covers within which the vial is located. Each of the lenses is provided with an upper portion extending above the upper surface of its associated vial cover, and the lens upper portions are provided with mating structure for interlocking the lenses together. The mating structure preferably comprises a tongue-and-groove arrangement. In addition, a connection arrangement is provided for securing each lens to its associated vial cover. The connection arrangement consists of one or more locking tabs located adjacent the window opening formed in each vial cover, and engagement structure, in the form of protrusions, provided on each lens for engagement with the locking tabs to secure the lenses to the vial covers.

The invention further contemplates an improvement in a level, and a method of making a level, substantially in accordance with the foregoing summary.

Various other objects, features and advantages of the invention will be made apparent from the following description taking together with the drawings.

BRIEF DESCRIPTION OF THE DRAWINGS

The drawings illustrate the best mode presently contemplated of carrying out the invention.

In the drawings:

FIG. 1 is an isometric view of a level incorporating the top-reading magnification feature of the invention;

FIG. 2 is a partial exploded isometric view showing the pair of vial covers, the lenses secured to the vial covers, the vial, and a portion of the level frame which includes the opening within which the vial is positioned;

FIG. 3 is a partial exploded isometric view showing one of the vial covers and the lens adapted to be secured thereto, with the lens including the transparent magnifying element defined by its upper portion;

FIG. 4 is a section view taken generally along line 4—4 of FIG. 1;

FIG. 5 is a section view taken generally along line 5—5 of FIG. 4;

FIG. 6 is a partial section view taken generally along line 6—6 of FIG. 5; and

FIG. 7 is a partial section view taken generally along line 7—7 of FIG. 5.

DETAILED DESCRIPTION OF THE PREFERRED EMBODIMENT

Referring to FIG. 1, a level 10 generally consists of an I-shaped metal frame 12 having an upper horizontal flange 14, a lower horizontal flange 16, and a vertical web 18 extending between and interconnecting flanges 14, 16. A series of vials shown at 20, 22 and 24 are mounted within stamped openings formed in web 18. As shown in FIG. 2, a stamped opening 25 is formed in web 18, and includes notches, such as shown at 26 and 28, which are adapted to receive the ends of vial 22. Similar stamped openings are formed in web 18 for vials 10 and 24. This manner of mounting vials to the web of a level frame is known in the art.

As further shown in FIG. 2, a pair of vial covers 30, 32 are adapted for placement one on either side of web 18, for enclosing vial 22 and maintaining it in engagement with the notches, such as 26, 28, formed in web 18. Similarly, vial 20 is enclosed by a pair of vial covers, one of which is shown in FIG. 1 at 34, and vial 24 is enclosed by a pair of vial covers, one of which is shown in FIG. 1 at 36.

Referring to FIGS. 1 and 2, an opening 38 is formed in top flange 14. Opening 38 is in communication with stamped opening 25 in web 18 within which vial 22 is located. In this manner, vial 22 can be viewed through opening 38.

As shown in FIGS. 2 and 3, vial cover 30 has a transparent lens assembly 40 secured thereto. Vial cover 30 is provided with a window opening 42 and a cut-out 44 in its upper surface 46. Lens assembly 40 is injection molded of a transparent plastic material, and provides a lens panel 48, a pair of lens side walls 50 and 52, and a lower wall 54. Lens assembly 40 further includes an upper portion, shown generally at 56, which includes an elongated convex magnifying element 58. Magnifying element 58 is of a shape and size, viewed in plan, substantially identical to the interior shape defined by opening 38 in upper flange 14. Upper portion 56 further includes a C-shaped shoulder 60 which partially surrounds magnifying element 58. A pair of spaced projections 62, 64 extend laterally from the side of magnifying element 58 opposite the long central portion of C-shaped shoulder 60. The facing ends of spaced projections 62, 64, in combination with the edge of magnifying element 58, cooperate to define a slot.

Lens side walls 50, 52 are provided with arcuate recesses 66, 68, respectively. In addition, lens side wall 50 is provided with a pair of locating tabs 70, 72 and a pair of locking projections 74, 76. Lens side wall 52 is similarly provided with pairs of locating tabs 70, 72 and locking projections 74, 76.

Vial cover 30 includes a pair of locking tabs 78, 80 extending inwardly from the front wall of vial cover 30 and located adjacent one edge of window opening 42. A facing pair of locking tabs 82, 84 are provided adjacent the opposite edge of window opening 42. Locking tabs 78-84 each include inwardly-facing protrusions, such as shown at 86, 88 with respect to locking tabs 78, 80, respectively.

Lens assembly 40 is assembled to vial cover 30, to attain the assembled position as shown in FIG. 2, by means of a push-on motion. Proper alignment of lens assembling tabs, such as 70, 72, engaging the upper edge of locking tab 82 and the lower edge of locking tab 84, respectively, during push-on engagement of lens assembly 40 with vial cover 30. The locking projections, such as 74, 76, engage the protrusions, such as 86, 88 provided on the locking tabs 78-84, which deflect outwardly until the locking projections, such as 74, 76 pass the protrusions, such as 86, 88, on the locking tabs 78, 84. Upon continued push-on engagement of lens assembly 40 with vial cover 30, the locking tabs, such as 78-84, return to their undeflected position so that the protrusions, such as 86, 88 are positioned over the locking projections, such as 74, 76, to secure lens assembly 40 in position on vial cover 30. When so secured, the upper portion 56 of lens assembly 40 extends above upper surface 46 of vial cover 30, in a manner as is shown in FIG. 2. Lens panel 48 is positioned within window opening 42.

A second lens assembly, shown generally at 90 in FIG. 2, is secured to vial cover 32 in the same manner as described with respect to lens assembly 40 and vial cover 30. Lens assembly 90 includes an upper portion 92 which defines a pair of end walls 94, 96, a central projection 98, and a pair of recesses 100, 102. Upper portion 92 extends above the upper surface 104, of vial cover 32. Lens assembly 90 further includes a lens panel 106, a pair of lens side walls 108, 110, and a lower wall 112. An arcuate notch 114 is formed in side wall 108, and a similar notch 116 is formed in side wall 110.

Vial covers 30, 32, with lens assemblies 40, 90, respectively, connected thereto in the manner described, are assembled to level frame 10 by positioning each vial cover and lens assembly one on either side of web 18 after vial 22 is engaged with web 18, such as at notches 26, 28. When the vial covers and lens assemblies are in their assembled position, a pair of projections 118, 120 (FIG. 3) which extend rearwardly from the front wall of vial cover 30, extend into a pair of openings 122, 124 (FIG. 2) provided in a pair of bosses extended rearwardly from the front wall of vial cover 32. A pair of screws, such as shown at 126 in FIG. 2, are inserted through openings 122, 124 to threadedly engage openings formed in projections 118, 120, to secure vial covers 30 and 32 to each other, with web 18 sandwiched therebetween. A recess, shown in FIG. 2 at 128, is formed in web 18 to accommodate projections 118, 120 extending through web 18.

Notches 66, 68 in side walls 50, 52, respectively, of lens assembly 40 accommodate vial 22 and serve to maintain vial 22 in engagement with the notches, such as 26, 28 associated with opening 25 in web 18. In a similar manner, notches 114, 116 in side walls 108, 110, respectively, of lens assembly 90 accommodate the opposite side of vial 22 to maintain vial 22 in position on web 18.

FIG. 4 illustrates, in section, vial covers 30, 32 and lens assemblies 40, 90 assembled to web 18 of level frame 12. As shown in FIG. 4, C-shaped shoulder 60 provided on upper portion 56 of lens assembly 40 engages the underside of upper flange 14 of level frame 12 adjacent opening 38. Magnifying element 58, which is convex in cross-section to provide magnification, extends upwardly into opening 38, with the upper surface of magnifying element 58 being disposed below the upper surface of upper flange 14. Spaced projections 62 provided on upper portion 56 of lens assembly 40 also engage the underside of upper flange 14 adjacent opening 38. Between projections 62 and 64, central projection 98 provided on upper portion 92 of lens assembly 90 engages the underside of upper flange 14 adjacent opening 38. End walls 94, 96 provided on upper portion 92 of lens assembly 90 also engage the underside of upper flange 14 adjacent the end portions of opening 38. With this arrangement, the internal cavity defined by vial covers 30, 32 in combination with lens assemblies 40, 90 is sealed so as to prevent dirt or other foreign material from entering the cavity where it could obstruct the viewing of vial 22.

With magnifying element 58 disposed within opening 38 formed in upper flange 14, vial 22 is magnified by magnifying element 58 when viewed through opening 38 in upper flange 14. This feature allows the position of the bubble within vial 22 to be ascertained with greater clarity than without magnification.

Vial covers 30, 32 are preferably injection molded.- plastic components formed of any satisfactory thermoplastic material such as ABS or the like. Lens assemblies 40, 90 are preferably injection molded components formed of a transparent acrylic material. Other satisfactory clear plastic materials, such as polycarbonate, could be employed.

Various alternatives and embodiments are contemplated as being within the scope of the following claims particularly pointed out and distinctly claiming the subject matter regarded as the invention.

I claim:

1. A level, comprising:
    a lower flange defining a substantially flat horizontal bottom surface adapted for placement on a work surface;
    an upper flange defining a top surface spaced from the bottom surface;
    a web extending between the upper and lower flanges, the web having a vial-receiving first opening formed therein;
    a vial located within the first opening for providing an indication of the relationship to level of the work surface when the bottom surface is placed thereon;
    a second opening formed in the upper flange top surface in visual communication with the vial-receiving first opening to allow the vial to be viewed through the upper flange opening;
    a pair of vial covers located one on either side of the web for enclosing the vial and maintaining the vial in position relative to the web, wherein each vial cover defines a window opening for providing visual access to the vial therethrough;
    a transparent magnifying element located between the vial and the second opening for providing magnification of the vial when viewed through the second opening; and
    a transparent lens located within each window opening, wherein each lens is positioned between one of the vial covers and a side of the web, and wherein the magnifying element is formed integrally with a first one of the lenses.

2. The level of claim 1, wherein the first lens is positioned between a side of the web and a first one of the vial covers, and wherein the first lens includes a laterally extending upper portion which extends above an upper surface of the first vial cover, and wherein the magnifying element is defined by the laterally extending upper portion of the first lens.

3. The level of claim 2, wherein a second one of the lenses is positioned between a side of the web and a second one of the vial covers, and wherein the second lens includes an upper portion which extends above an upper surface of the second vial cover.

4. The level of claim 3, wherein the upper portions of the first and second lenses include structure engaging the underside of the upper flange adjacent the opening formed therein, to provide a seal for the vial-receiving opening.

5. The level of claim 3, further comprising mating structure associated with the upper portions of the first and second lenses for interlocking the first and second lenses together.

6. The level of claim 5, wherein the mating structure comprises a tongue-and-groove arrangement.

7. The level of claim 2, wherein a second one of the lenses is positioned between a side of the web and a second one of the vial covers, and further comprising a connection arrangement for securing the first lens to the first vial cover and for securing the second lens to the second vial cover.

8. The level of claim 7, wherein the connection arrangement comprises one or more inwardly extending locking tabs located adjacent the window opening of each vial cover, and engagement structure interposed between each lens and the locking tabs for securing the first and second lenses to the first and second vial covers, respectively.

9. In a level comprising a substantially flat horizontal bottom surface adapted for placement on a work surface, a top surface spaced from the bottom surface, a body portion interposed between the top and bottom surfaces and including a cavity, and a vial located within the cavity, wherein the top and bottom surfaces are defined by an upper flange and a lower flange, respectively, and wherein the body portion comprises a web extending between the flanges and the cavity comprises a vial-receiving opening formed in the web, the improvement comprising:
    an opening formed in the upper flange for providing visual access to the cavity to allow the vial to be viewed through the opening;
    a pair of vial covers located one on either side of the web for maintaining the vial in position within the opening formed in the web, wherein each vial cover defines a window opening for providing visual access to the vial therethrough;
    a transparent lens located within each window opening; and
    a transparent magnifying element located between the vial and the upper flange opening for providing magnification of the vial when viewed through the upper flange opening, wherein the transparent magnifying element is formed integrally with a first one of the lenses.

10. The improvement of claim 9, wherein each lens is positioned betwen one of the vial covers and a side of the web.

11. A method of making a level, comprising the steps of:
    providing a unitary level frame having a pair of horizontal flanges with a vertical web disposed therebetween;
    forming a vial-receiving opening in the web;
    forming an opening through the top flanges in visual communication with the vial-receiving opening formed in the web;
    placing a vial within the vial-receiving opening, whereby the vial is visible through the opening in the top flange;
    placing a transparent magnifying element between the top flange opening and the vial to provide magnification of the vial when viewed through the top flange opening;
    securing a pair of vial covers one on either side of the web, with each vial cover including a window opening to provide viewing of the vial therethrough; and
    securing a transparent lens to each vial cover, and wherein the transparent magnifying element is formed integrally with one of the transparent lenses.

* * * * *